Aug. 30, 1927. 1,640,631
R. G. WEISSEL
AUTOMOBILE LOCK
Filed Dec. 22, 1924  2 Sheets-Sheet 1

INVENTOR
Robert G. Weissel
BY M. C. Frank
ATTORNEY

Aug. 30, 1927.　　　　　　　　　　　1,640,631
R. G. WEISSEL
AUTOMOBILE LOCK
Filed Dec. 22, 1924　　　2 Sheets-Sheet 2

INVENTOR
Robert G. Weissel
BY
M. C. Frank
ATTORNEY

Patented Aug. 30, 1927.

1,640,631

UNITED STATES PATENT OFFICE.

ROBERT G. WEISSEL, OF OAKLAND, CALIFORNIA.

AUTOMOBILE LOCK.

Application filed December 22, 1924. Serial No. 757,347.

My present invention relates to automobile locks, and more particularly to locks designed for attachment to the steering wheel column of the automobile, whereby the steering wheel of the vehicle may be locked against operative movement, thus rendering the vehicle unsteerable.

This application is supplementary to, and an improvement on a previous patent issued to me for automobile locks December 28, 1920, Patent Number 1,363,448.

It will be noted by reference to the said patent, that the principal object thereof is the construction of a lock whereby the means for securing the said lock to the vehicle steering wheel column are concealed and access thereto precluded.

The principal object of this invention, is the provision of coacting means adapted to lock the steering wheel of an automobile against rotation and simultaneously break the ignition circuit to the engine when the button of the lock is pressed, thereby locking the car and stopping the engine thereof at the same time. These two features effect a double lock to the car against the unauthorized use thereof.

A further object is the provision of a lock having an engaging collar rigidly secured to the hub of the steering wheel, and adapted to be engaged by the locking mechanism at several points, whereby said steering wheel may be locked with the wheels of the car in a straight line or at an angle as desired.

Another object of this invention is the provision of a lock of simple construction, easily operable and adapted for advantageous location, and one which presents an outer surface that is smooth and uninterrupted by the working parts thereof and proof against access thereto when in locked or unlocked position.

With the above and other objects in view, the invention comprises certain novel features of construction, form and arrangement of parts which will be fully set forth hereinafter. The accompanying two sheets of drawings, forming a part of this specification illustrate an embodiment of my invention, and what I claim as new, is particularly pointed out in the appended claim following the specification.

Figure 1 of the drawings, is an elevation of the preferred embodiment of my invention mounted on the steering wheel column of an automobile.

Figure 1:
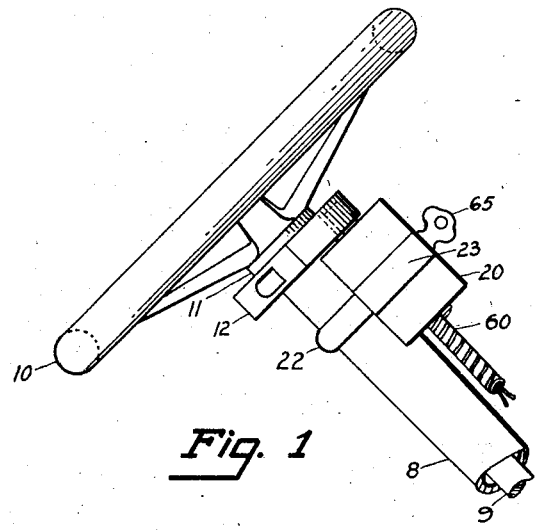

Adverting to the drawings and figures thereof: Like characters of reference designate corresponding parts throughout, and in which the numeral 8 indicates an automobile steering wheel column housing the steering rod 9, and to which is secured the customary steering wheel 10, having a hub 11 adapted to receive the locking collar 12 of my invention, Fig. 2.

The said locking collar consists of two halved sections of metal 13 and 14 bolted together, and has an opening therethrough for engagement with the said hub of the steering wheel. Tap bolts 15 are recessed in section 13 of the collar, and connect the other section 14 thereof around the said hub at the diametrical parting line 16. The section 14 is provided with a hardened and pointed pin 17 for engagement with the hub 11 of the steering wheel. When the sections 13 and 14 comprising the collar are placed around the said hub and drawn together by the said bolts, the said point is caused to sink into the hub and serves to hold the collar and wheel as a rigid unit. In the collar, concentrically arranged slots 18 are formed from the underface of section 14, and a similar slot 19 from the underface of section 13.

The housing 20 of the lock is of cast metal and preferably rectangular in shape, and is secured to the steering wheel column directly below and adjacent to the locking collar 12. The underface of said housing is semi-circular to receive a semi-circular bushing 21 adapted to fit against the cylindrical surface of the steering wheel column.

Figures 5, 6:
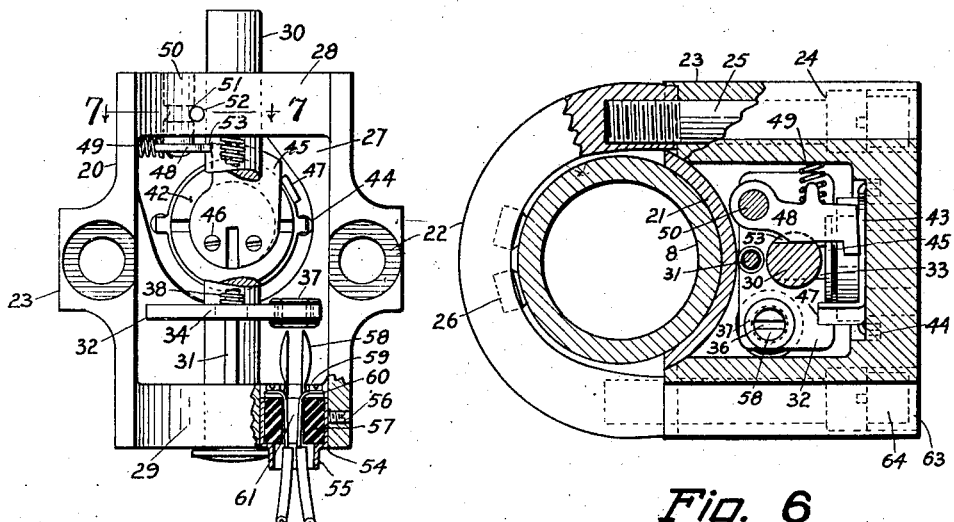
Fig. 5 is a view in elevation of the lock-housing as it appears when removed from the steering column and in reverse position of that shown in Fig. 3. Part of the ignition connection is shown in section, also the column yoke; and parts in front of the lock are broken away for clearness.
Fig. 6 is a transverse section taken upon line 6—6 of Fig. 4.

A semi-circular retaining yoke 22 is adapted to encircle the steering wheel column and engage the housing 20 in the bosses 23. The yoke is provided with threaded holes and which register with corresponding holes in the said bosses. The latter holes are counterbored from the outer face of the housing to provide shoulders 24 therein to receive machine screws 25; the latter, when in position are countersunk as shown in Fig. 6. Set studs 26 are positioned in the inner face of the yoke, and are adapted to engage and sink into the steering wheel column when the said screws are tightened to draw the retaining yoke to position thereagainst, to hold the housing in rigid relation with said steering wheel column.

The housing has a cored recess as indicated at 27, Fig. 5, forming top and bottom walls 28 and 29 respectively. A vertical bore, Fig. 4, extends through both walls to receive the locking bolt 30, which is shown in position to engage any one of the several slots of the collar 12. A smaller bore adjacent to bolt 30 extends through the top wall of the housing and partly into the bottom wall thereof to receive a fixed rod 31.

Figures 3, 4:
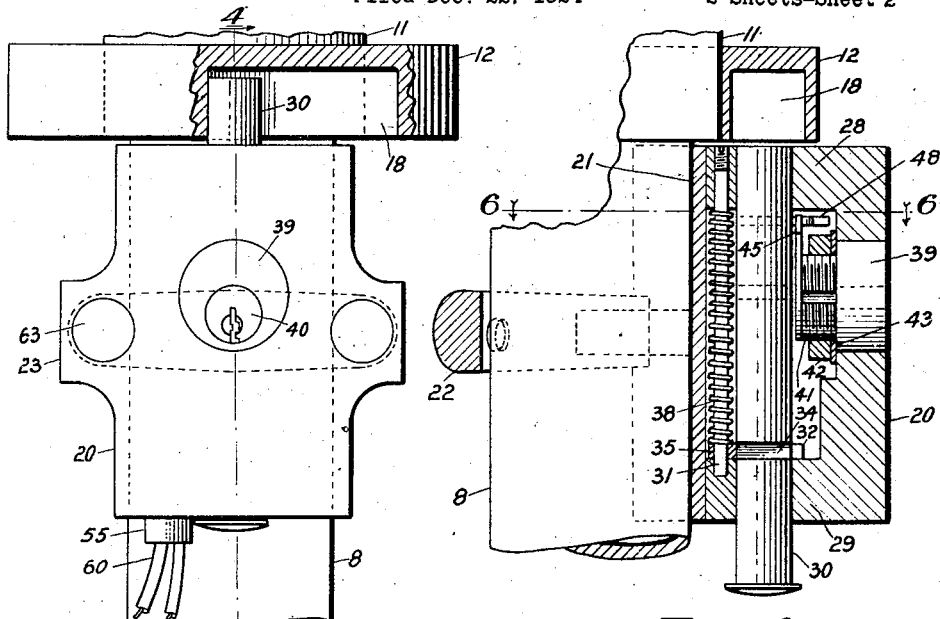
Fig. 3 is a front elevation of the device with the locking collar partly in section and showing the locking bolt in engagement therewith.
Fig. 4 is a vertical section taken upon lines 4—4 of Figs. 2 and 3, and showing the locking bolt out of engagement or in unlocked position.

An actuating plate 32, Figs. 4, 5 and 6, has a kerf 33 cut from one edge thereof to engage transverse kerfs 34 oppositely cut in the locking bolt 30 for rigid connection therewith. In the said plate and immediately back of its kerf 33 is a hole 35 for the passage therethrough of the aforesaid rod 31, which latter forms a vertical guide for said plate. The plate 32 normally rests against the bottom 29 of the housing, and limits the outward movement of the locking bolt 30. An opening 36, Fig. 6, is formed in one corner of said plate and is adapted to receive a circuit closer 37 in the form of a metallic collar, and which is insulated from said plate and will be hereinafter more fully described.

A compression spring 38 encircles the rod 31 and extends between the plate 32 and the underface of the top wall 28 of the housing, and normally tends to hold the locking bolt, by virtue of its integral plate, out of engagement with the slots in the locking collar 12.

The retaining shell 39 for the cylinder lock 40, Fig. 3, is of an ordinary type and extends through the housing 20 into its cored recess 27. The inner portion of the retaining shell is of smaller diameter and screw threaded as indicated at 41, Fig. 4 to receive a lock nut 42. An annular retaining ring 43 encircles the threaded portion 41 between the lock nut 42 and shell 39, and bears against said shell and the inner face of the front wall of the housing. Said ring 43 has diametrically arranged fingers 44 extending into openings formed in the inner face of the housing, to hold said ring and lock-shell against rotative movement. The cylinder lock 40 extends eccentrically thru the lock-shell 39, and is provided at its inner end with an upwardly extending actuating arm 45, Fig. 5, held in place to said cylinder by screws 46. An upright stop 47, Fig. 5 is formed on the retaining ring 43 in position to limit the backward movement of said actuating arm 45.

Figure 7:
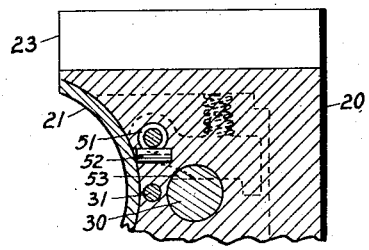
Fig. 7 is a sectional detail taken upon line 7—7 of Fig. 5.

A spring actuated latch 48, Figs. 5 and 6, is pivotally secured in the recess and to the top wall 28, and extends forwardly and normally bears against the actuating arm 45 of the cylinder lock, and is held in this position by a coil spring 49. The said latch 48 is rigid with an upwardly extending pin 50, pivotally supported in the top wall 28 of the housing. The latch pin has a circumferential grove 51 adapted to be engaged by a transversely arranged retaining pin 52, shown to advantage in Fig. 7, extending into the top wall of the housing, and intercepting the groove, thereby holding the latch 48 in suspended support.

In the bolt 30 is formed a kerf 53, adapted for engagement with the latch 48 to hold the said bolt in locked position as shown in Fig. 5.

A hole 54, Fig. 5, is formed through the bottom wall 29 of the housing to receive a "make and break" mechanism, and which consists of a casing 55 adapted for securement in said hole by a set screw 56; said casing has an insulator plug 57 bedded therein, and to which contact clips 58 extending upwardly are secured in position by screws 59. The wire terminals 60 of the engine ignition circuit extend through an opening 61 in the plug and are terminated at the said contact clips and held thereto by said screws. The contact clips are of spring metallic material, and are adapted to enter the opening in the aforesaid circuit-closer collar 37 when the plate 32 approaches and rests aganst the bottom of the housing. The said wire terminals and contact clips are in series with the ignition circuit, and when the bolt 30 is moved to locked position as shown in Figs. 3 and 5, the circuit is broken, and when in unlocked position as shown in Fig. 4 the circuit is closed.

Figure 2:
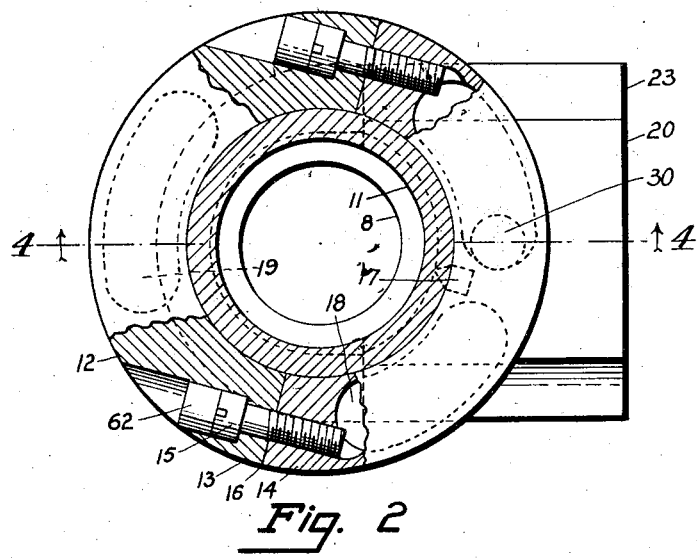
Fig. 2 is an enlarged plan thereof, parts being broken away for clearness of illustration and the hub of the steering wheel is shown in section.

When the locking collar 12 is secured in final position upon the hub 11 of the steering wheel, Fig. 2, chilled steel plugs 62 may be inserted in the counterbored bolt holes of bolts 15, and driven against said bolts to prevent the removal thereof.

Caps 63, Figs. 3 and 6, are provided and adapted to fit in the counterbored screw holes formed in the bosses 23 of the housing. Within the caps chilled plugs 64 may be inserted, and said caps and plugs may then be driven into the said holes and against the heads of the screws 25 to form a flush outer surface with the housing and also serve to prevent the removal of these machine screws.

In operation, and when it is desired to lock the steering wheel against operative movement, the projecting locking bolt 30 is pressed upwardly by the operator against the pressure of spring 38, until kerf 53 in said bolt is engaged by the tensioned latch 48 as shown in Fig. 5. In this engagement the upper end of said bolt has entered one of the slots in the locking collar 12, and has effected the locking of said fixed collar and steering wheel with the fixed housing on the steering wheel column, and at the same time has effected the breaking of the ignition circuit to the engine, thus effecting substantially a double locking of the automobile.

When it is desired to release the steering wheel from the locked position, key 65, Fig. 1, is inserted in the key slot of the lock and turned in a clock-wise direction, which turns and forces actuating arm 45 against the latch 48, thereby moving the spring-tensioned latch out of engagement with the kerf 53 in bolt 30 and effecting the releasement of said bolt by reason of the reaction of the compressed spring 38, which returns the bolt to its normal position and closes the ignition circuit.

The bushing 21 may be of various sizes to accommodate steering wheel columns of different diameters, and in some cases it may be dispensed with entirely, the housing fitting directly against the column.

It will be noted that in my issued patent aforementioned, that the recess in the housing is from its front face and the latter is closed by a removable front plate. This construction is open to objection, as the mechanism therein can be reached and the bolt released. In the present invention this objection is overcome by recessing the housing from the inside face and keeping the front face solid as shown in the figures.

Having thus illustrated and described my invention in its preferred form, I wish it to be understood that the same may be modified as practice suggests. Therefore, the patent protection that I desire is all of that which comes within the spirit and scope of the invention as claimed.

I claim:

An automobile steering wheel lock comprising a collar attached to the steering wheel, a housing adjacent said collar attached to the steering wheel column, a locking bolt extending through said housing and adapted to be manually pushed to locking position with said collar, a spring operated latch cooperating with said bolt to hold it in locked position, means for releasing said latch, a transverse plate within said housing carried by said bolt, a guide rod fixed in said housing parallel to said bolt passing through an aperture in said plate, a compression spring surrounding said guide rod reacting against said plate to return said bolt to unlocked position, separated clips connected to the ignition circuit located in the bottom of said housing and insulated therefrom and means carried by said plate and insulated therefrom for electrically connecting said clips in order to complete the ignition circuit.

In testimony whereof I affix my signature.

ROBERT G. WEISSEL.